July 30, 1968  J. GACHOT  3,394,915
BALL VALVE WITH ANNULAR SEAL
Filed June 26, 1967  2 Sheets-Sheet 1
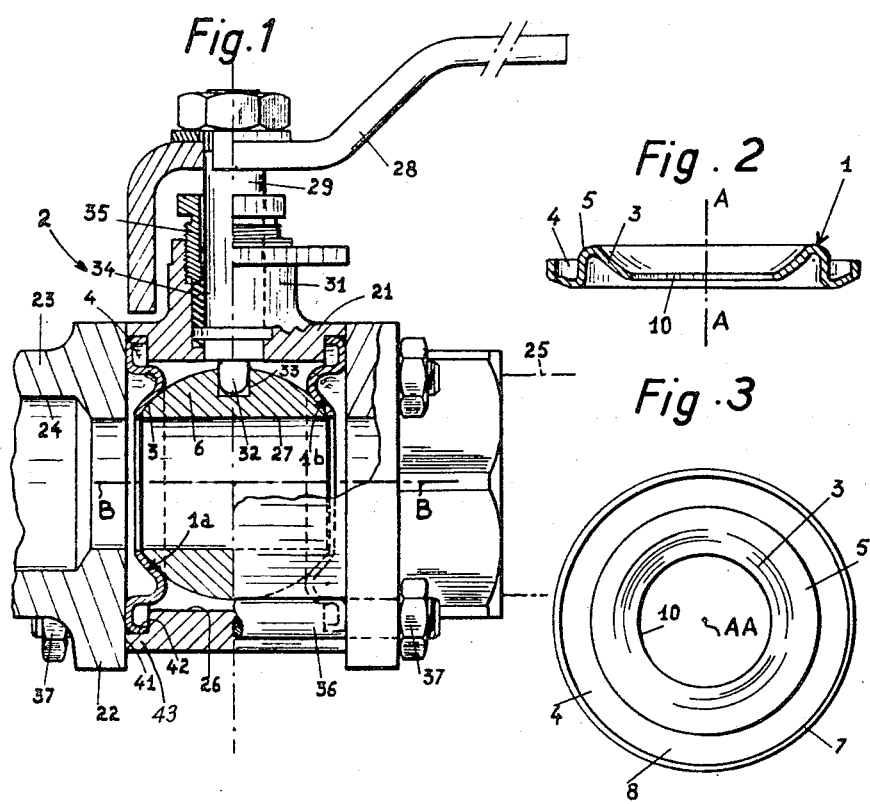
INVENTOR
JEAN GACHOT
By Young & Thompson
ATTYS.

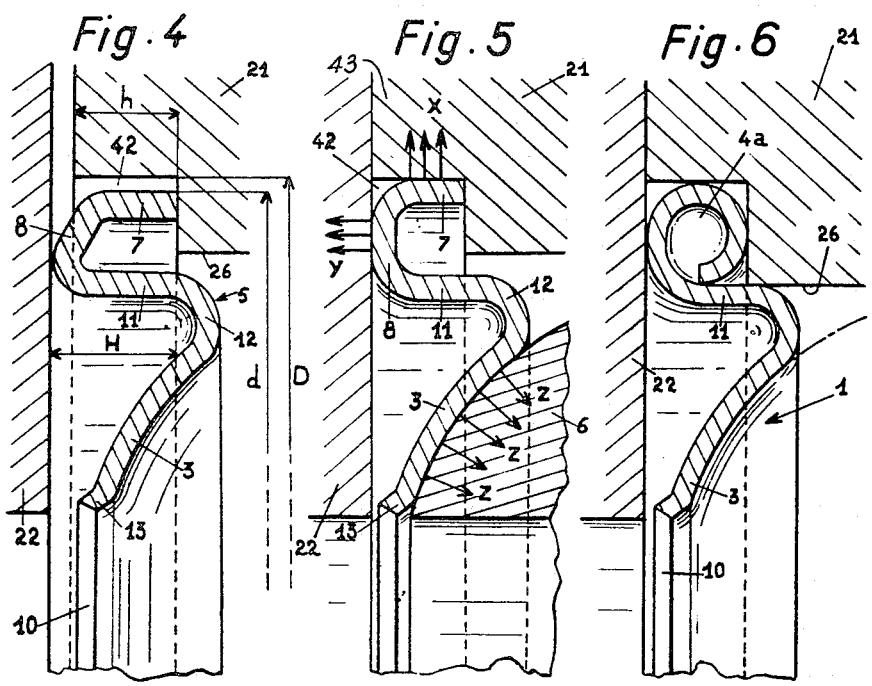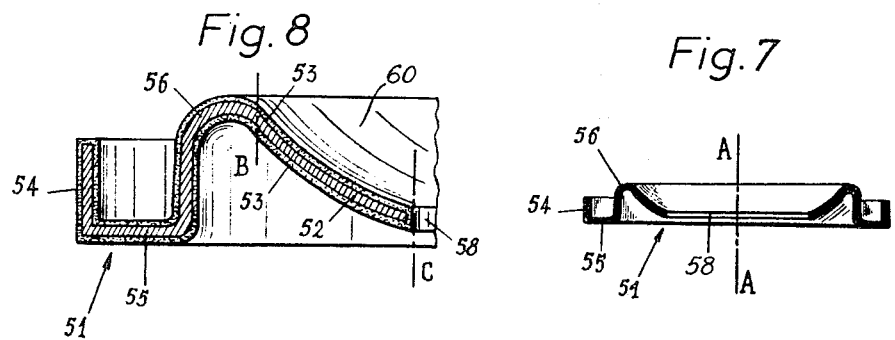

United States Patent Office 3,394,915
Patented July 30, 1968

3,394,915
BALL VALVE WITH ANNULAR SEAL
Jean Gachot, 179 Ave. de la Division Leclerc,
Enghien, France
Filed June 26, 1967, Ser. No. 648,644
Claims priority, application France, July 5, 1966,
68,145; Aug. 23, 1966, 73,847
7 Claims. (Cl. 251—174)

ABSTRACT OF THE DISCLOSURE

The ball valve comprises a valve body in which is housed a rotary plug-type ball provided with a radial passageway and mounted between two annular seals applied against the valve body, at least one seal being constituted by an annular member formed of material which is endowed with elasticity. The annular member is provided with an internal spherical bearing surface which serves as a seating for the ball and which is joined to a peripheral flange by an elastically deformable junction surface.

---

This invention relates to a ball valve fitted with annular seals and is more specifically directed to the structure of said seals.

The term "ball valve" is understood to mean a device of either the valve or cock type in which the closing member consists of a spherical plug, or "ball," which is pierced by a diametral passageway. The ball is housed within the body of the valve or cock and is designed to close off the passageway through which fluid flows within said valve body.

In valves or cocks of this type, the ball is rotatably mounted inside the body and is maintained between two annular seals which are applied tangentially against said ball by means of flanges. These flanges, which are placed on each side of the valve body are applied against this latter by clamping members such as tie-bolts.

Provision has already been made in the prior art for annular seals, especially in the form of rings made of the plastic polytetrafluoroethylene (PTFE). Seals of this type have in fact proved wholly satisfactory when the valve is utilized under ordinary temperature conditions. However, if the valve is required to operate either at ambient temperature or at very low temperature (for example in the case in which liquid nitrogen is circulated therethrough) or on the contrary at very high temperatures (for example when steam is circulated through the valve at a temperature of the order of 300 or 350° C.), defective leak-tightness may then arise by reason of the high coefficient of expansion of PTFE.

At the present time, cocks and valves are additionally required to be fireproof or, in other words, to withstand temperatures of the order of 400 to 500° C. without incurring any appreciable damage, and this is particularly the case in the petroleum industry.

In order to conform to this requirement, valves are subjected to temperatures of 400 to 500° C. by heating them with ignited petroleum products and, after several hours of this treatment, they are further required to permit normal operation while still exhibiting satisfactory leak-tightness. Massive seals made of PTFE are liable to sublimate at such high temperatures, which is liable to cause damage to the spherical seating.

The seals which are contemplated by the present invention are intended to meet operating conditions of a particularly exacting nature such as those which have just been mentioned.

In accordance with the invention, the ball valve comprising a valve body in which is housed a rotary plug-type ball pierced by a radial passageway and mounted between two annular seals applied against said valve body is characterized in that at least one seal is constituted by an annular member formed of material which is endowed with elasticity, said member being provided with an internal spherical bearing surface which serves as a seating for the ball and which is joined to a peripheral flange by an elastically deformable junction surface.

Preferably, the valve comprises two identical seals adapted to grip the ball which is mounted elastically between said seals.

As a further advantageous feature, the junction surface of the seal which joins the spherical bearing surface to the peripheral flange has a U-shaped profile and the seal is additionally provided with a profile which has substantially the shape of an S or of the numeral 5.

The seal can advantageously be constituted by a high-strength and slightly elastic material such as stainless steel, the surface of which is treated by chromium-plating or nickel-plating, the ball itself being formed of stainless steel or even of ceramic material.

In accordance with a preferred arrangement, the peripheral flange of the seal can be deformed elastically once the seal has been fitted in position, said deformation being exerted in a direction parallel to the axis and/or in a direction at right angles to said axis.

In an advantageous form of execution, the peripheral flange of the seal terminates in a wall which is substantially parallel to the axis and adapted to bear endwise on the valve body, said peripheral flange being provided with a bearing surface which is intended to come into contact with the flange of the pipe in which the valve is mounted. These arrangements are highly favorable to leak-tightness.

So far as the valve body is concerned, there is preferably formed at each end an annular recess in which the peripheral flange of the corresponding seal is fitted and these flanges are deformed elastically by clamping the valve body between the adjacent pipe-flanges.

This deformation ensures elastic clamping of the ball which nevertheless remains freely mounted between the flanges of the valve.

According to another form of execution of the invention, the core of the seal is covered with a leak-tight and continuous sheath which is formed of plastic material. As a preferred feature, said sheath has self-lubricating properties and is advantageously formed of PTFE or a product which is endowed with similar properties.

Other properties and advantages of the invention will become apparent from the description which now follows below.

In the accompanying drawings, which are given solely by way of example and not in any limiting sense:

FIG. 1 is a fragmentary axial sectional view of a ball valve fitted with seals in accordance with the invention;

FIG. 2 is a view in sectional elevation on an axial plane and showing a first form of execution of the seal;

FIG. 3 is the corresponding plan view;

FIG. 4 is an enlarged transverse sectional view of a portion of the seal which is shown in FIGS. 2 and 3, said seal being shown during assembly in the valve;

FIG. 5 is a view which is similar to FIG. 4 and showing the seal once it has been mounted;

FIG. 6 is a view which is similar to FIG. 5 and showing a first alternative form of execution of the seal;

FIG. 7 is a transverse sectional view which is similar to FIG. 2 and showing another alternative form of execution of the seal;

FIG. 8 is an enlarged fragmentary sectional view of a portion of the seal shown in FIG. 7.

Referring now to FIG. 1 of the accompanying drawings, there is shown at 2 a ball valve which comprises a valve body 21 terminating in two plane faces, said valve body being detachably mounted between flanges 22 forming part of pipe-couplings 23 which provide passageways 24 located in the line of extension of a pipe which is shown diagrammatically at 25. The valve body 21 is provided with an internal chamber 26 in which is housed the ball 6, there being formed in said ball a diametral passageway 27.

Control of the angular position of the passageway 27 relatively to the axis BB of the valve body 21 is effected by means of a handle 28 and this latter is rigidly fixed to a shaft 29 which traverses the valve body 21 through a collar 31 and which terminates in a lug 32, said lug being engaged in a groove 33 of the ball 6. Leak-tightness of the chamber 26 relatively to the shaft 29 is ensured by means of a seal 34 which is held in position by means of a packing-gland 35 and this latter is screwed into the collar 31.

The pipe-coupling flanges 22 are intended to be applied against the valve body 21 by means of tie-bolts 36 fitted with nuts 37. In the example herein described, the tie-bolts 36 are placed around the valve body 21 and serve as supports on the side opposite to the collar 31.

In accordance with the present invention, the ball 6 is held within the chamber 26 by means of two seals which have the general reference 1 and which are designated in FIG. 1 by the references 1a, 1b.

Each seal 1 is constituted by an annular member which is formed, for example, by die-stamping in such a manner as to form an internal spherical bearing surface 3 which is disposed around a central opening 10 and which is joined to a peripheral flange 4 by an elastically deformable junction portion 5.

The seal 1 is advantageously formed of metal and preferably of stainless steel, for example of a steel which has been slightly work-hardened and which has a certain degree of elasticity. The concave surface of the spherical surface 3 on which the ball 6 of the valve 2 is intended to bear can be given a surface treatment of the purpose of reducing frictional contact with said ball. For example, the treatment referred to can consist of an abrasion polishing process or alternatively of a chemical nickel-plating or hard chromium plating process.

In the particular case in which the seal 1 is not intended to withstand high temperatures, said seal can also be formed by molding by means of a synthetic resin which is endowed with rigidity while nevertheless having a certain elasticity, such as an epoxide resin which is reinforced with glass fibers. In all cases, steps are taken to ensure that the diameter of the internal surface 3 corresponds to the external diameter of the ball 6.

In the rest condition, the peripheral edge 4 has an outer wall 7 constituting a cylindrical flange which is parallel to the axis A—A of the seal. The wall 7 is followed by a bottom portion 8 which constitutes in the rest condition a surface which is substantially conical relatively to the axis A—A. The bottom portion 8 is joined to the bearing surface 3 by a junction portion 5 comprising a cylindrical portion 11 and a toric portion 12.

Broadly speaking, it can therefore be stated that the seal has a profile approximating to that of an S or the numeral 5, whilst the junction surface 5 which permits the elastic displacement of the bearing surface 3 relatively to the annular flange 4 has a U-shaped cross-section.

Finally, it is intended in accordance with the invention to form a slight annular depression 13 (shown in FIG. 4) on that portion of the bearing surface 3 which is immediately adjacent to the opening 10.

The seals 1a, 1b are disposed symmetrically in such a manner that the spherical bearing surfaces 3 are applied against the ball 6 around the opening of the passageway 27 when the valve is in the open position of FIG. 1.

The valve body 21 is also machined so as to provide annular recesses 42 in the vicinity of its terminal faces 41, and bounded radially outwardly by annular flanges 43 integral with valve body 21, said annular recesses being intended to accommodate the peripheral flange 4 of the corresponding seals 1a, 1b.

The dimensional relations between the recess 42 and the flange of the seal 1 are preferably as shown in FIG. 4, viz:

The external diameter $d$ of the wall 7 is slightly smaller than the internal diameter $D$ of the recess 42. On the contrary, the height $H$ which is measured between the free edge of the wall 7 and the contact surface in the rest position between the bottom portion 8 of the seal 1 and the terminal face of the pipe-coupling flange 22 is greater than the depth $h$ of the annular recess 42.

Under these conditions, when the pipe-coupling flanges 22 are applied against the faces 41 by tightening the nuts 37 of the tie-rods 36, the flange 4 of each seal is deformed elastically as shown in FIG. 5. Thus, the wall 7 is forcibly applied (as shown by the arrows X) against the flange 43 which constitutes the radially outer wall of the annular recess 42 as a result of a reaction produced by the deformation of the bottom portion 8 which is applied against the pipe-coupling flange 22 (as indicated by the arrows Y). The seal flange 4 thus establishes two sealing zones which have the effect of preventing any leakage between the pipe-coupling flanges 22 and the valve body 21.

The elastic deformation which is imparted to the seal 1 as a result of the clamping action is also transmitted by the elastic junction portion 5 which also works and thus ensures intimate contact between the bearing surface 3 and the wall of the ball 6 (as shown by the arrows Z).

The ball 6 is thus freely mounted inside the valve body 21 and is elastically applied against the spherical bearing surfaces 3 of both seals 1a, 1b. Experience has shown that, under these conditions, and especially when use is made of stainless steel balls, a remarkable degree of leak-tightness can be obtained. Even better results have been achieved by using ceramic balls which may also be provided with a vitrified surface after having been ground by machining.

In all cases the annular depression 13 of the seal 1 prevents any projection or flash which may be present at the level of the opening 10 from scoring the ball 6.

It will be understood that the invention is not limited to the examples of execution which have been described in the foregoing and that alternative forms could be contemplated.

Thus, in FIG. 6, the flange 4a of the seal 1 is constituted by a rolled-down edge of metal having a substantially toric volume. Said rolled-down edge is flattened elastically at the time of clamping of the pipe-coupling flanges 22 against the valve body 21 so as to ensure leak-tightness as described above.

In this example, provision is additionally made for a contact between the cylindrical portion 11 of the surface 5 and the surface of the chamber 26.

In the embodiment of FIGS. 7 and 8, the seal 51 comprises a shaped core 52 which is entirely covered by a protective sheath 53.

The core 52 is preferably formed of a material which is endowed with rigidity but which does not have elastic properties. The core can consist in particular of spring-steel sheeting or preferably of stainless steel sheeting. As a rule, the core 52 is of relatively small thickness (from a few tenths of a millimeter to a few millimeters).

The annular core 52 has been shaped in particular by die-stamping in such a manner as to provide a peripheral flange 54 which is parallel to the axis A—A of the seal. The flange 54 is joined by a trough 55 having a straight base to an annular projection 56, the convex portion of which is directed towards the same side as the concave portion of the trough 55.

The projection 56 has an internal slope whose surface constitutes a spherical seating 60 in the portion B C of its generator-line which forms part of the central orifice 58 of the seal. The height of the spherical zone B C and its radius are designed to conform to the spherical surface of the valve ball; the diameter of the orifice 58 is preferably made to correspond to that of the passageway which is formed in said ball.

The sheath 53 is formed of a material which is dependent on the design service conditions of the valve. In the usual cases, said material can be constituted by a layer of ordinary plastic material which is deposited by coating, spraying or dipping. Alternatively, said layer can be formed by molding around the core 2, polyethylene being particularly well suited to this purpose. However, it will be found preferable to employ a plastic which is endowed with self-lubricating properties; and if the ball valve is intended to be in contact with chemically aggressive agents or to operate either at very low or very high temperatures, either PTFE or one of the many compositions at present known which contain this material can accordingly be employed.

A number of techniques are open to selection for the purpose of sheathing the core 52 with PTFE or a like material. In the case in which the sheath 53 is deposited by dipping or coating, the core 52 can first be die-stamped prior to performing this operation.

In the case of PTFE, a number of different methods can be employed. In particular, a strip of PTFE can be bonded to a flat annular sheet, the bonding process being carried out by means of a resin of the epoxide type, for example, said resin being polymerized in situ. The sheet which is thus covered is then die-stamped.

The sheet could also be covered with a fine-mesh glass fiber fabric which is in turn covered with particles of PTFE.

Whether the core is die-stamped or not, it would also be possible to deposit thereon a varnish having a PTFE base and containing a volatile binder.

The thickness of the sheath 53 is preferably substantially less than that of the core 52. Said thickness is not usually uniform unless the sheath 52 is placed in position after die-stamping. Should this not be the case, constant thickness may nevertheless be ensured if the layer of plastic material does not have uniform thickness at the outset. In some cases, it may prove an advantage to reinforce the layer on the spherical bearing surface 60.

The seal as thus constructed presents a number of advantages in regard to resistance to aggressive agents (especially acids) and in regard to its resistance in the event of an important variation in temperature. In particular, it is possible by means of said seal to construct ball valves which are effectively fireproof, that is to say which are capable of withstanding temperatures of the order of 400 to 500° C.

The self-lubricating material which constitutes the sheath 53 ensures correct operation of the valve with an opposing couple which is practically constant at all temperatures, this feature being of practical interest for remote operation of the ball.

The positioning of the seals 51 on each side of the ball is carried out as described earlier and the bottom portion of the trough 55 bears on the pipe-coupling flange which is located in opposite-facing relation thereto.

Said seals are deformed elastically when the valve is clamped between the adjacent pipe-coupling flanges.

The operating temperature of said seals is slightly lower than that of the seals of the first form of embodiment, but experience has shown that the leak-tightness obtained is excellent, even in the case of very substantial variations in temperature or pressure and also in vacuo. Moreover, the utilization of a sheath 53 having a PTFE base makes it possible to obtain a valve which is effectively fireproof.

A further important advantage of the seal which is contemplated by this invention is the possibility of leaving the ball valve fitted with said seal in the partially open position during service. In the case of ball valves comprising solid seals formed of pure PTFE, this is practically impossible without incurring the risk of damage.

What I claim is:

1. In a ball valve comprising a valve body having a chamber therein, a rotary plug-type ball disposed in the chamber and having a passageway therethrough, means for rotating the ball in the chamber, a pair of end members disposed on opposite sides of the chamber and completing a flow passageway through the valve, a pair of annular sealing members having their radially inner portions disposed in sealing relation on opposite sides of the ball and having their radially outer portions disposed between the valve body and the end members on opposite sides of the valve body, and means for releasably urging the end members toward each other; the improvement comprising an annular flange between the valve body and at least one of the end members, the flange outwardly bounding an annular recess between the valve body and said one end member, the radially inner side of said recess opening into said chamber, the valve body and said one end member being releasably held together by said releasable means in a closed position in which said flange is pressed between the valve body and said one end member, at least one said sealing member being of elastic material and having a generally S-shaped cross-sectional configuration and having its radially outer portion disposed in said annular recess in compression between opposite sides of said recess and in compression against said flange and with the edge of said one sealing member disposed on the side of said one sealing member which is remote from said one end member thereby to force said one sealing member against the ball.

2. A valve as claimed in claim 1, said flange being integral with the valve body.

3. A valve as claimed in claim 1, said edge being in edgewise abutment and in compression against the valve body.

4. A valve as claimed in claim 1, said edge being spaced from the valve body.

5. A valve as claimed in claim 1, at least the portions of said radially outer portion that contact said flange and said one end member having a surface of a self-lubricating plastic material.

6. A valve as claimed in claim 1, said at least one sealing member comprising a resilient metal base coated with a self-lubricating plastic material.

7. A valve as claimed in claim 1, said at least one sealing member in its undeformed condition having a width greater than the width of said recess and an outer diameter less than the inner diameter of said flange.

References Cited

UNITED STATES PATENTS

| 2,573,177 | 10/1951 | Bohlen | 251—174 X |
| 2,890,856 | 6/1959 | Clade | 251—174 |
| 3,077,331 | 2/1963 | Burtis | 251—174 X |
| 3,159,377 | 12/1964 | Samour | 251—175 |

FOREIGN PATENTS 978,601  12/1964  Great Britain.

CLARENCE R. GORDON, *Primary Examiner.*